US010268038B2

(12) United States Patent
Karasik

(10) Patent No.: US 10,268,038 B2
(45) Date of Patent: Apr. 23, 2019

(54) CAMERA LENS WASHING DEVICE

(71) Applicant: Methode Electronics, Inc., Carthage, IL (US)

(72) Inventor: Vladimir Karasik, Walled Lake, MI (US)

(73) Assignee: Methode Electronics, Inc., Carthage, IL (US)

( * ) Notice: Subject to any disclaimer, the term of this patent is extended or adjusted under 35 U.S.C. 154(b) by 35 days.

(21) Appl. No.: 15/267,938

(22) Filed: Sep. 16, 2016

(65) Prior Publication Data
US 2018/0081169 A1    Mar. 22, 2018

(51) Int. Cl.
G02B 27/00    (2006.01)
G03B 17/02    (2006.01)
G03B 17/56    (2006.01)

(52) U.S. Cl.
CPC ......... *G02B 27/0006* (2013.01); *G03B 17/02* (2013.01); *G03B 17/56* (2013.01)

(58) Field of Classification Search
CPC .. G02B 27/0006; G03B 17/568; G03B 17/56; G03B 17/02
See application file for complete search history.

(56) References Cited

U.S. PATENT DOCUMENTS

| 5,588,055 A | 12/1996 | Williamson et al. |
| 5,779,205 A | 7/1998 | Ching |
| 7,891,886 B2 | 2/2011 | Schuetz |
| 8,243,137 B2 | 8/2012 | Schuetz |
| 8,444,329 B2 | 5/2013 | Nakamura et al. |
| 8,448,914 B2 | 5/2013 | Roehr et al. |
| 8,671,504 B2 | 3/2014 | Ono et al. |
| 8,821,043 B2 | 9/2014 | Schutz |
| 8,836,789 B2 | 9/2014 | Liepold et al. |
| 8,857,687 B1 | 10/2014 | An |
| 8,961,044 B2 | 2/2015 | Barthel |
| 8,988,526 B2 | 3/2015 | Schutz |
| 9,150,165 B1 | 10/2015 | Fortin et al. |
| 9,193,308 B2 | 11/2015 | Okuda |
| 9,380,190 B2 | 6/2016 | Pawlowski |

(Continued)

FOREIGN PATENT DOCUMENTS

| CN | 104768802 A | 7/2015 |
| DE | 102011078230 A1 | 1/2013 |

(Continued)

*Primary Examiner* — Kimberly N. Kakalec
(74) *Attorney, Agent, or Firm* — Blank Rome LLP

(57) ABSTRACT

A camera lens washing device that includes an outer housing that has a main opening for receiving a camera lens, an attachment end configured to mount to a camera housing of the camera lens, and an exposed end remote from the attachment end. The exposed end includes an end face that has a recessed area extending inwardly therefrom. An inner ring is received in the recessed area of the outer housing. The inner ring is configured to frame the camera lens. A plurality of nozzles are defined between the outer housing and the inner ring. The plurality of nozzles are configured to discharge fluid radially inwardly towards the camera lens. The inner ring may be substantially stationary with respect to the outer housing. The nozzles may be disposed at or near a top side of the main opening of the outer housing.

24 Claims, 4 Drawing Sheets

(56) References Cited

U.S. PATENT DOCUMENTS

| | | |
|---|---|---|
| 9,380,192 B2 | 6/2016 | Barthel |
| 9,446,721 B2 | 9/2016 | Jagoda |
| 9,457,733 B2 | 10/2016 | Schutz |
| 9,487,161 B2 | 11/2016 | Rawlings et al. |
| 9,580,023 B2 | 2/2017 | Bruss et al. |
| 9,725,049 B2 | 8/2017 | Buschmann |
| 9,910,272 B2 | 3/2018 | Witte |
| 2004/0218042 A1* | 11/2004 | Kanada ............... B60R 1/00 348/148 |
| 2009/0122141 A1 | 5/2009 | Nakamura et al. |
| 2009/0309971 A1 | 12/2009 | Schuetz |
| 2010/0040361 A1 | 2/2010 | Schuetz |
| 2011/0155874 A1 | 6/2011 | Roehr et al. |
| 2011/0292212 A1 | 12/2011 | Tanabe et al. |
| 2012/0007984 A1 | 1/2012 | Schutz |
| 2012/0207461 A1 | 8/2012 | Okuda |
| 2012/0315027 A1 | 12/2012 | Schutz |
| 2013/0182112 A1 | 7/2013 | Liepold et al. |
| 2013/0294758 A1 | 11/2013 | Barthel |
| 2013/0335624 A1 | 12/2013 | Barthel |
| 2014/0085467 A1 | 3/2014 | Barthel |
| 2014/0169866 A1 | 6/2014 | Bruss et al. |
| 2015/0008300 A1 | 1/2015 | Jagoda |
| 2015/0030319 A1 | 1/2015 | Matori |
| 2015/0042804 A1 | 2/2015 | Okuda |
| 2015/0097013 A1 | 4/2015 | Rawlings et al. |
| 2015/0109447 A1 | 4/2015 | Okuda |
| 2015/0185592 A1* | 7/2015 | Eineren ............. G03B 17/02 348/375 |
| 2015/0203077 A1 | 7/2015 | Gokan |
| 2015/0258944 A1 | 9/2015 | Buschmann |
| 2015/0274089 A1 | 10/2015 | Schutz |
| 2015/0343999 A1 | 12/2015 | Lopez Galera et al. |
| 2015/0344001 A1 | 12/2015 | Lopez Galera et al. |
| 2016/0001330 A1 | 1/2016 | Romack et al. |
| 2016/0101735 A1 | 4/2016 | Trebouet |
| 2016/0103316 A1 | 4/2016 | Rousseau |
| 2016/0245011 A1 | 8/2016 | Schuetz |
| 2016/0272163 A1* | 9/2016 | Dreiocker ............ B60S 1/56 |
| 2016/0347258 A1 | 12/2016 | Buss |
| 2017/0050581 A1 | 2/2017 | Buss |
| 2017/0064161 A1 | 3/2017 | Buss |
| 2017/0106808 A1 | 4/2017 | Fuchs et al. |
| 2018/0201232 A1* | 7/2018 | Ringler ............... B60S 1/52 |

FOREIGN PATENT DOCUMENTS

| | | |
|---|---|---|
| EP | 1648737 B1 | 11/2006 |
| EP | 3103684 A1 | 12/2016 |
| WO | WO-2008014870 A1 | 2/2008 |
| WO | WO-2009056510 A1 | 5/2009 |
| WO | WO-201511439 A1 | 1/2015 |
| WO | WO-2015/110439 A1 | 7/2015 |
| WO | WO-2016083317 A1 | 6/2016 |
| WO | WO-2016177577 A1 | 11/2016 |

\* cited by examiner

US 10,268,038 B2

CAMERA LENS WASHING DEVICE

FIELD OF THE INVENTION

The present invention relates to a device for effectively and efficiently washing a lens of a camera, such as a camera located on a vehicle, that has a simplified design with no impact on the angle of view.

BACKGROUND OF THE INVENTION

The lenses of cameras mounted to vehicles often become dirty due to environmental and weather conditions, thereby impacting safe driving. Cleaning devices exists to address this problem. See, for example, U.S. Published Patent Application Nos. 2016/0103316 to Rousseau, 2016/0101735 to Trebouet, 2016/0001330 to Romack et al, 2015/0344001 to Lopez Galera et al., 2015/0343999 to Lopez Galera et al., 2015/0203077 to Gokan, and 2011/0292212 to Tanabe et al., the subject matter of each of which is herein incorporated by reference. However, such conventional cleaning devices are often ineffective, bulky, and obstruct the camera's field of view.

Therefore, a need exists for a camera lens washing device that effectively and efficiently washes the camera lens while also having a compact profile and not obstructing the field of view of the camera lens.

SUMMARY OF THE INVENTION

Accordingly, the present invention may provide a camera lens washing device that includes an outer housing that has a main opening for receiving a camera lens, an attachment end configured to mount to a camera housing of the camera lens, and an exposed end remote from the attachment end. The exposed end includes an end face that has a recessed area extending inwardly therefrom. An inner ring is received in the recessed area of the outer housing which is configured to frame the camera lens. A plurality of nozzles are defined between the outer housing and the inner ring. The plurality of nozzles are configured to discharge fluid radially inwardly towards the camera lens. The inner ring may be substantially stationary with respect to the outer housing.

The present invention may also provide a camera lens washing device that includes an outer housing that has a main opening for receiving a camera lens. The main opening has opposite top and bottom sides. The outer housing also has an attachment end configured to mount to a camera housing of the camera lens and an exposed end remote from the attachment end. The exposed end includes an end face that has a recessed area extending inwardly therefrom. An inner ring is received in the recessed area of the outer housing which is configured to frame the camera lens. A plurality of nozzles are defined between the outer housing and the inner ring. The plurality of nozzles may be disposed at or near the top side of the main opening of the outer housing such that the plurality of nozzles are configured to discharge fluid radially inwardly towards the bottom side of the main opening of the outer housing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing figures.

DETAILED DESCRIPTION OF THE INVENTION

Figure 1:
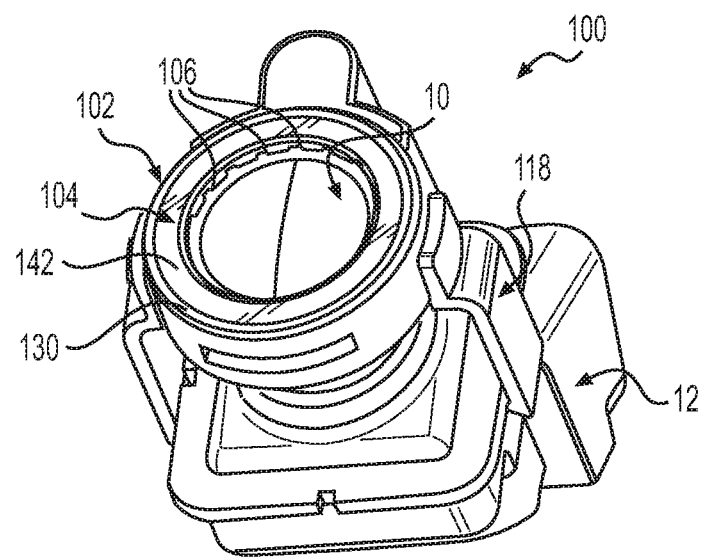
FIG. 1 is a perspective view of a camera lens washing device according to an exemplary embodiment of the present invention.

Referring to FIGS. 1-7, the present invention relates to a washing device 100 and 100' for a camera lens 10, such as for a camera mounted on a vehicle. The camera lens washing device 100 and 100' has a simplified design while providing improving washing and field of view of the lens. In general, the camera lens washing device 100 and 100' includes an outer housing 102 and an inner ring 104 that cooperate with one another to form multiple nozzles 106 therebetween that are preferably disposed around a top side of the camera lens 10 for discharging fluid, such as water or other lens washing fluid, radially inwardly and toward the camera lens 10 for cleaning the same. The washing fluid is preferably under pressure to be distributed through the nozzles 106 creating multiple fluid jets from different locations toward the center of the camera lens 10. The camera lens washing device 100 and 100' has an improved compact design and camera field of view.

Outer housing 102 generally includes a main body 110 that may be substantially ring shaped and includes a main opening 112 therein for receiving the camera lens 10. One end of main body 110 is an attachment end 114 configured to mount to a camera housing 12 of the lens 10. The other end of main body 110 is an exposed end 116, as best seen in FIG. 1. In one embodiment, attachment end 114 includes one or more latching arms 118 that extend from main body 110 in a direction away from exposed end 116 for snap fitting onto the camera housing 12. Alternatively, attachment end 114 may include other known methods of attachment, such as screw fastening or adhesive. Main opening 112 of outer housing 102 includes a top side 120 and an opposite bottom side 122. A fluid source attachment 124 is provided in the outer housing 102 that is configured for engagement with a fluid source, such as a water hose or line. Fluid source attachment 124 may be an extension with an inner bore 126 in fluid communication with the nozzles 106. Fluid source attachment 124 is preferably located at the top side 120 of main opening 112 in outer housing 102 to allow the fluid to flow downwardly towards the nozzles 106.

Figure 4:
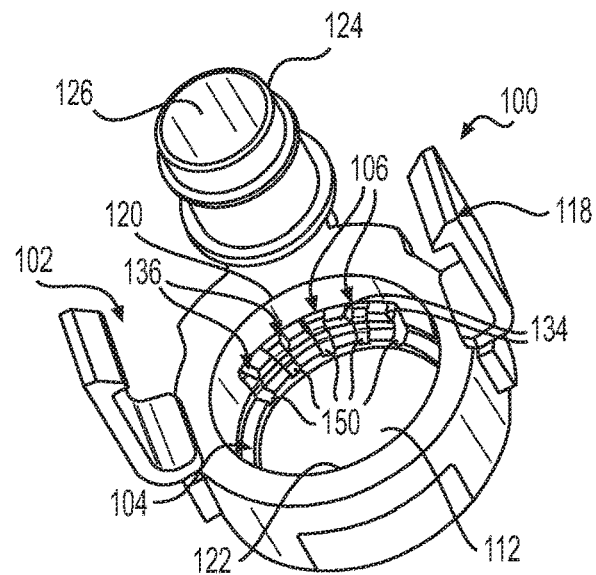
FIG. 4 is a perspective view of a housing subassembly of the camera lens washing device illustrated in FIG. 1.
Figure 5:
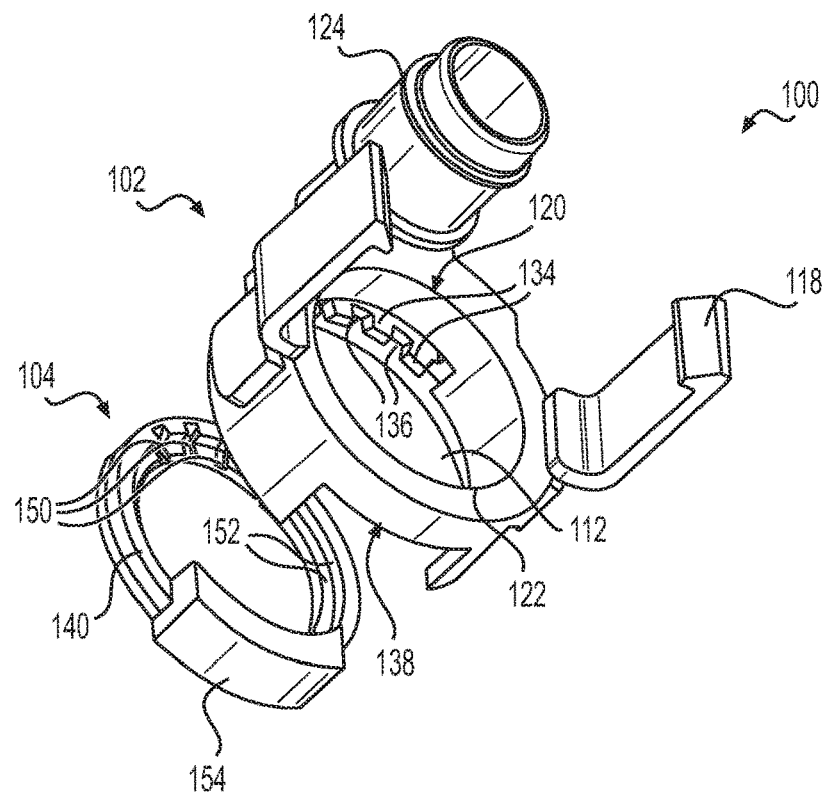
FIG. 5 is an exploded perspective view of the housing subassembly illustrated in FIG. 4.

Exposed end 116 of outer housing 102 includes an end face 130. A recessed area 132 extends inwardly from end face 130 for accepting inner ring 104. Extending inwardly from main opening 112 are spaced tabs 134 which define fluid path slots 136 therebetween, as best seen in FIGS. 4 and 5, which are in fluid communication with fluid source attachment 124. Spaces tabs 134 may be located adjacent to recessed area 132. Remote from the spaced tabs 134 on main body 110 is an alignment member 138 for aligning inner ring 104 with respect to outer housing 102.

Figure 2:
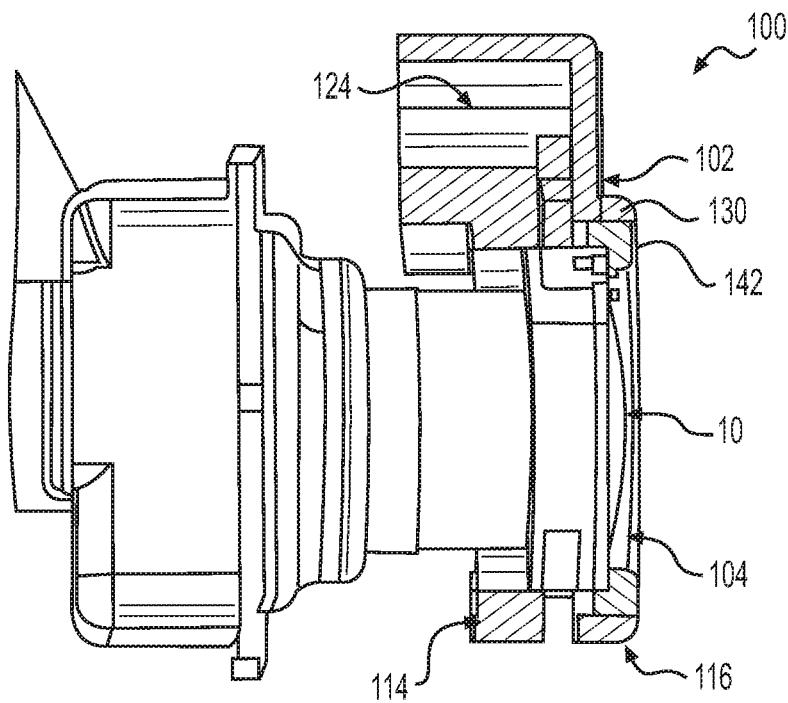
FIG. 2 is side elevational cross-sectional view of the camera lens washing device illustrated in FIG. 1.
Figure 3:
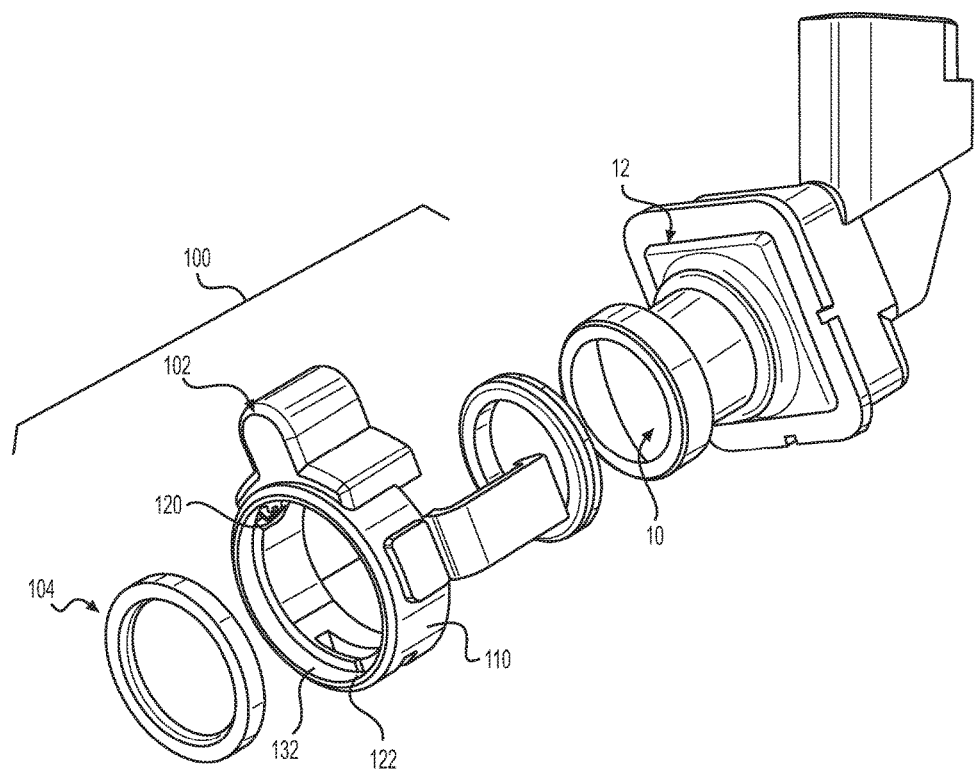
FIG. 3 is an exploded perspective view of the camera lens washing device illustrated in FIG. 1.

Inner ring 104 is configured and sized to frame the camera lens 10, as best seen in FIG. 1. Inner ring 104 is preferably formed separately from outer housing 102 and is received in recessed area 132 of outer housing 102. Inner ring 104 may be fixed to outer housing 102, such as by laser welding inner ring 104 in recessed area 132 or by other known attachments. Inner ring 104 includes a mounting face 140 (FIG. 5) that engages recessed area 132 and an opposite exposed face (FIG. 1) 142. An inner diameter surface 144 of inner ring 104 is between mounting face 140 and exposed face 142. In a preferred embodiment, exposed face 142 of inner ring 104 does not extend beyond and is substantially flush with end face 130 of outer housing 102, as seen in FIG. 2, thereby not negatively impacting the camera's field of view.

A plurality of channels 150 are provided in inner diameter surface 144 of inner ring 104, as best seen in FIGS. 4 and 5. Channels 150 substantially align with fluid path slots 136 of outer housing 102 to form the nozzles 106. Each channel 150 substantially aligns with one of the fluid path slots 136 to form one of the nozzles 106. Each channel 150 preferably extends into mounting face 140 of inner ring 104 and may include a step 152 to facilitate fluid flow through nozzles 106.

Remote from channels 150 is an alignment member 154 that corresponds to alignment member 138 of outer housing 102 to ensure proper alignment between inner ring 104 and outer housing 104 to form the nozzles 106. In one embodiment, alignment member 154 may be a protruding flange (FIG. 5), for example, and alignment member 138 may be a cut-out in main body 110 sized to accept flange 154, or vice versa. The alignment member 138 preferably includes a channel that allows the fluid or water from the fluid source attachment 126 to pass therethrough to the channels 150 and slots 136 of nozzles 106.

Other alignment or keying methods may be used as long as channels 150 and slots 136 are substantially aligned in order to form the nozzles 106. Nozzles 106, including tabs 134 and channels 150, are preferably located at or near the top side 120 of main opening 112 such that fluid from fluid source attachment 124 can flow downwardly through slots 136 and channels 150 so that nozzles 106 discharge the fluid directly onto the camera lens 10. And because nozzles 106 are on the top of the lens 10, gravity will subsequently wash away the fluid from the lens 10. In a preferred embodiment, none of the nozzles 106 are located at the bottom, that is the bottom side 122 of the main opening 112 such that the nozzles 106 are only provided near or at top side 120. The nozzles 106 may be evenly spaced from one another and radially arranged with respect to the lens 10, as best seen in FIG. 4.

A sealing member 160 (FIG. 3), such as a seal ring, may be provided on attachment end 114 to seal the plurality of channels 150 and slots 136 between inner ring 104 and outer housing 102.

Figure 6:
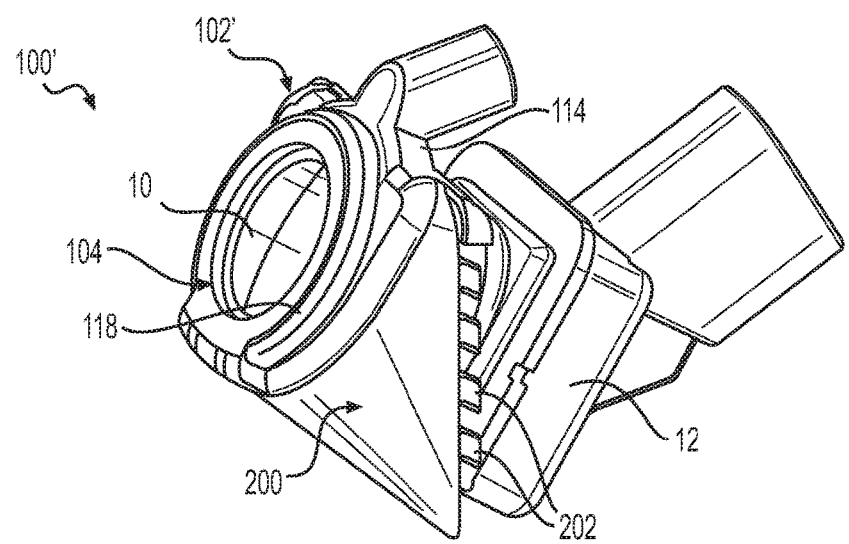
FIG. 6 is a perspective view of a camera lens washing device according to an alternative exemplary embodiment of the present invention.
Figure 7:
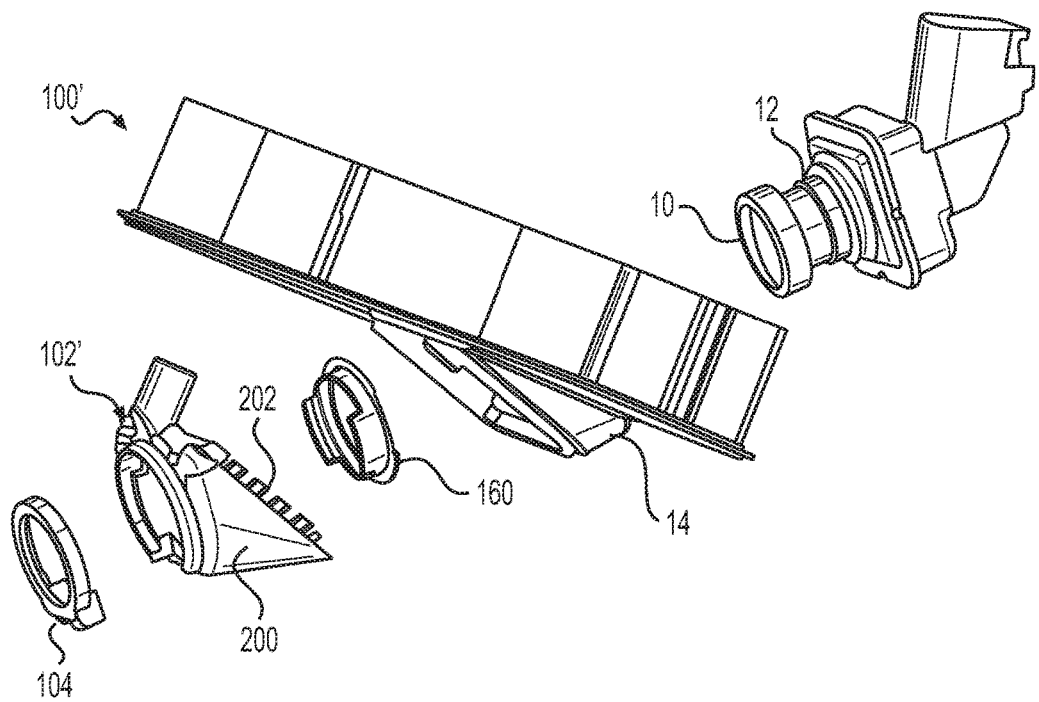
FIG. 7 is an exploded perspective view of the camera lens washing device illustrated in FIG. 6.

FIGS. 6 and 7 illustrate an alternative embodiment of the camera lens washing device 100'. Camera lens washing device 100' is substantially the same as the camera lens washing device 100 of the first embodiment, except that the outer housing 102' thereof includes shroud extension 200 for attaching to a camera module 14 that supports the camera lens 10. Shroud extension 200 replaces latch arms 118 and may include an engagement member 202, such as a plurality of teeth, for engaging the camera module 14. Shroud extension 200 is extends away from the exposed end 116 of outer housing 102' and is preferably sized to substantially surround the camera lens.

While particular embodiments have been chosen to illustrate the invention, it will be understood by those skilled in the art that various changes and modifications can be made therein without departing from the scope of the invention as defined in the appended claims.

What is claimed is:

1. A camera lens washing device, comprising:
    an outer housing having a main opening for receiving a camera lens, an attachment end configured to mount to a camera housing of the camera lens, and an exposed end remote from said attachment end, said exposed end including an end face having a recessed area extending inwardly therefrom;
    an inner ring received in said recessed area of said outer housing, said inner ring being configured to frame the camera lens; and
    a plurality of nozzles defined between said outer housing and said inner ring, said plurality of nozzles being configured to discharge fluid radially inwardly towards the camera lens,
    wherein said inner ring is substantially stationary with respect to said outer housing, and
    wherein said outer housing includes a plurality of tabs extending inwardly into said main opening, said plurality of tabs defining fluid path slots of said plurality of nozzles therebetween.

2. A camera lens washing device according to claim 1, wherein
    said inner ring includes an inner diameter surface, said inner diameter surface having a plurality of channels, each of said plurality of channels substantially aligns with one of said fluid path slots of said outer housing to form one of said plurality of nozzles.

3. A camera lens washing device according to claim 2, wherein
    said outer housing and said inner ring include corresponding alignment members for engaging one another and substantially aligning each of said fluid path slots with each of said plurality of channels, respectively.

4. A camera lens washing device according to claim 2, wherein
    said inner ring includes a mounting face for engaging said outer housing and an exposed face opposite said mounting face, said inner diameter surface being between said mounting face and said exposed face.

5. A camera lens washing device according to claim 4, wherein
    said plurality of channels extend into said mounting face of said inner ring.

6. A camera lens washing device according to claim 4, wherein
    said exposed face of said inner ring is substantially flush with said end face of said housing.

7. A camera lens washing device according to claim 1, wherein
    a sealing member is disposed on said attachment end of said outer housing.

8. A camera lens washing device according to claim 1, wherein
    said inner ring is separate from said outer housing.

9. A camera lens washing device according to claim 1, wherein
    said inner ring is welded to said recessed area of said outer housing.

10. A camera lens washing device according to claim 1, wherein
said outer housing includes a fluid source attachment in fluid communication with said fluid path slots.

11. A camera lens washing device according to claim 1, wherein
one or more latching arms extend from said attachment end of said outer housing away from said exposed end for engaging the camera housing.

12. A camera lens washing device according to claim 1, wherein
said attachment end of said outer housing includes a shroud extension extending away from said exposed end.

13. A camera lens washing device, comprising:
an outer housing having a main opening for receiving a camera lens, said main opening having opposite top and bottom sides, said outer housing having an attachment end configured to mount to a camera housing of the camera lens and an exposed end remote from said attachment end, said exposed end including an end face having a recessed area extending inwardly therefrom;
an inner ring received in said recessed area of said outer housing, said inner ring being configured to frame the camera lens; and
a plurality of nozzles defined between said outer housing and said inner ring, said plurality of nozzles being disposed at or near said top side of said main opening of said outer housing such that said plurality of nozzles are configured to discharge fluid radially inwardly towards said bottom side of said main opening of said outer housing,
wherein said outer housing includes a plurality of tabs extending inwardly into said main opening, said plurality of tabs defining fluid path slots of said plurality of nozzles therebetween.

14. A camera lens washing system according to claim 13, wherein
none of said plurality of nozzles are located at or near said bottom side of said main opening of said outer housing.

15. A camera lens washing system according to claim 14, wherein
said plurality nozzles being evenly spaced and radially arranged with respect to the main opening.

16. A camera lens washing system according to claim 14, wherein
said inner ring includes an inner diameter surface, said inner diameter surface having a plurality of channels, each of said plurality of channels substantially aligns with one of said fluid path slots of said outer housing to form one of said plurality of nozzles.

17. A camera lens washing system according to claim 16 wherein
said outer housing and said inner ring include corresponding alignment members for engaging one another and substantially aligning each of said fluid path slots with each of said plurality of channels, respectively.

18. A camera lens washing device according to claim 16, wherein
said inner ring includes a mounting face for engaging said outer housing and an exposed face opposite said mounting face, said inner diameter surface being between said mounting face and said exposed face.

19. A camera lens washing device according to claim 18, wherein
said plurality of channels extend into said mounting face of said inner ring.

20. A camera lens washing device according to claim 19, wherein
said exposed face of said inner ring is substantially flush with said end face of said housing.

21. A camera lens washing device according to claim 13, wherein
said inner ring is separate from said outer housing.

22. A camera lens washing device according to claim 13, wherein
said outer housing includes a fluid source attachment in fluid communication with said fluid path slots.

23. A camera lens washing device according to claim 13, wherein
one or more latching arms extend from said attachment end of said outer housing away from said exposed end for engaging the camera housing.

24. A camera lens washing system according to claim 13, wherein
said inner ring is substantially stationary with respect to said outer housing.

* * * * *